(12) United States Patent
Anderberg (10) Patent No.: US 11,729,507 B2
(45) Date of Patent: Aug. 15, 2023

(54) PROGRESSIVE MORPHOLOGICAL LENS PARAMETER ENCODING

(71) Applicants: Sony Group Corporation, Tokyo (JP); Sony Pictures Entertainment Inc., Culver City, CA (US)

(72) Inventor: Tobias Anderberg, Los Angeles, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 169 days.

(21) Appl. No.: 17/399,846

(22) Filed: Aug. 11, 2021

(65) Prior Publication Data

US 2022/0264016 A1    Aug. 18, 2022

Related U.S. Application Data

(60) Provisional application No. 63/148,753, filed on Feb. 12, 2021.

(51) Int. Cl.
*H04N 23/69* (2023.01)
*H04N 23/67* (2023.01)
*H04N 23/62* (2023.01)

(52) U.S. Cl.
CPC ............ *H04N 23/69* (2023.01); *H04N 23/62* (2023.01); *H04N 23/67* (2023.01)

(58) Field of Classification Search
CPC ........... H04N 5/23296; H04N 5/23212; H04N 5/23216
See application file for complete search history.

(56) References Cited

U.S. PATENT DOCUMENTS

| 7,477,297 | B2 | 1/2009 | Pollard |
| 2008/0218612 | A1 | 9/2008 | Border et al. |
| 2009/0034954 | A1 | 2/2009 | Kubota et al. |
| 2009/0102841 | A1 | 4/2009 | Clavadetscher |
| 2016/0189432 | A1 | 6/2016 | Bar-Zeev et al. |

(Continued)

FOREIGN PATENT DOCUMENTS

| CN | 104349020 A | 2/2015 | |
| CN | 110581943 | * 12/2019 | ......... H04N 5/23296 |

OTHER PUBLICATIONS

International Search Report in PCT/US2021-058119, dated Feb. 10, 2022.

(Continued)

*Primary Examiner* — Hung H Lam
(74) *Attorney, Agent, or Firm* — Procopio, Cory, Hargreaves & Savitch LLP (57) ABSTRACT

Automatically shifting between virtual lens parameters and optical lens parameters for an optical camera positioned within a physical scene, including: providing a spatial awareness of the physical scene including position and orientation of a display screen to the optical camera; creating a feedback loop between the optical camera and lens to enable the lens to communicate lens settings to a scene registration; determining when focus of the lens is beyond an optical focal limit from the lens settings; and enabling the lens, by the scene registration, to automatically shift from using the optical lens parameters to using the virtual lens parameters when the focus of the lens moves beyond the optical focal limit.

20 Claims, 5 Drawing Sheets

(56) References Cited

U.S. PATENT DOCUMENTS

| | | | |
|---|---|---|---|
| 2018/0041695 A1* | 2/2018 | Park | A63F 13/833 |
| 2018/0338123 A1* | 11/2018 | Moule | H04N 9/3185 |
| 2021/0255328 A1* | 8/2021 | Sanjeev | A63F 13/28 |
| 2022/0257173 A1* | 8/2022 | Sharma | A61B 5/7282 |

OTHER PUBLICATIONS

Eric Nelson, Zoom techniques for achieving scale invariant object tracking in real-time active vision systems, Sep. 27, 2006, Rochester Institute of Technology, Rochester, NY.

* cited by examiner

PROGRESSIVE MORPHOLOGICAL LENS PARAMETER ENCODING

CROSS-REFERENCE TO RELATED APPLICATIONS

This application claims the benefit of priority under 35 U.S.C. § 119(e) of U.S. Provisional Patent Application No. 63/148,753, filed Feb. 12, 2021, entitled "Progressive Morphological Lens Parameter Encoding." The disclosure of the above-referenced application is incorporated herein by reference.

BACKGROUND

Field

The present disclosure relates to processing and capturing video data for a video capture system, and more specifically, to automatically switching between optical lens parameters and virtual lens parameters.

Background

In a virtual production environment using a combination of optical cameras/lenses and virtual cameras/lenses in virtual scenes together with a physical LED display wall for displaying the virtual scene, there is a discrepancy between the optical lens parameters and how parameters relate to the virtual scene. Thus, it is difficult to effectively perform optical zoom onto, or focus on, objects that are "inside" the virtual scene, because the optical parameters may zoom and focus beyond the flat LED display where the virtual screen is shown.

SUMMARY

The present disclosure provides for implementing a technique for automatically shifting between optical lens parameters and virtual lens parameters depending on the physical location of a camera in relation to a defined fixed focal target.

In one implementation, a method of shifting between virtual lens parameters and optical lens parameters for an optical camera positioned within a physical scene is disclosed. The method includes: providing a spatial awareness of the physical scene including position and orientation of a display screen to the optical camera; creating a feedback loop between the optical camera and lens to enable the lens to communicate lens settings to a scene registration; determining when focus of the lens is beyond an optical focal limit from the lens settings; and enabling the lens, by the scene registration, to automatically shift from using the optical lens parameters to using the virtual lens parameters when the focus of the lens moves beyond the optical focal limit.

In one implementation, the spatial awareness of the physical scene includes orientation of the optical camera in relation to the display screen. In one implementation, the spatial awareness of the physical scene is managed by a processor and a storage unit in combination with the display screen. In one implementation, the spatial awareness of the physical scene includes an indoor positional system. In one implementation, the method further includes communicating the virtual lens parameters to a virtual camera system to render a virtual scene on the display screen. In one implementation, the virtual lens parameters are continuously communicated to the virtual camera system, even when the optical lens parameters are used, so that the virtual camera system can adjust settings for real-time operation. In one implementation, the virtual camera system provides a virtual camera and lens with same characteristics as the optical camera. In one implementation, the method further includes communicating position and orientation of the optical camera to the virtual camera system. In one implementation, the virtual camera system includes an algorithm that converts the optical lens parameters and orientation of the optical camera into converted virtual lens parameters. In one implementation, the method further includes calculating and displaying at least one of depth of field and auto-exposure using the converted virtual lens parameters.

In another implementation, a system of shifting between virtual lens parameters and optical lens parameters is disclosed. The system includes: an optical camera and lens positioned within a physical scene; a display screen positioned within the physical scene; and a processor to provide a spatial awareness of the physical scene including position and orientation of the display screen to the optical camera, to create a feedback loop between the optical camera and the lens to receive the lens settings from the lens, to determine when focus of the lens is beyond an optical focal limit from the lens settings, and to enable the lens to automatically shift from using the optical lens parameters to using the virtual lens parameters when the focus of the lens moves beyond the optical focal limit.

In one implementation, the spatial awareness of the physical scene includes orientation of the optical camera in relation to the display screen. In one implementation, the processor manages the spatial awareness of the physical scene in combination with the display screen and a storage unit. In one implementation, the system further includes an indoor positional system to provide the spatial awareness of the physical scene to the processor. In one implementation, the system further includes a virtual camera system to render a virtual scene on the display screen using the virtual lens parameters. In one implementation, the virtual camera system provides a virtual camera and lens with same characteristics as the optical camera. In one implementation, the virtual camera system includes a conversion function to map parameters from the optical camera to the virtual camera. In one implementation, the virtual camera system includes an algorithm that converts the optical lens parameters and orientation of the optical camera into converted virtual lens parameters. In one implementation, the processor calculates and displays at least one of depth of field and auto-exposure using the converted virtual lens parameters.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, in a conventional virtual production environment using a combination of optical cameras/lenses and virtual cameras/lenses in virtual scenes together with a physical LED display wall for displaying the virtual scene, there is a discrepancy between the optical lens parameters and how parameters relate to the virtual scene. Thus, it is difficult to effectively perform optical zoom onto, or focus on, objects that are "inside" the virtual scene. That is, the optical parameters may zoom and focus beyond the flat LED display where the virtual screen is shown.

Figure 1:
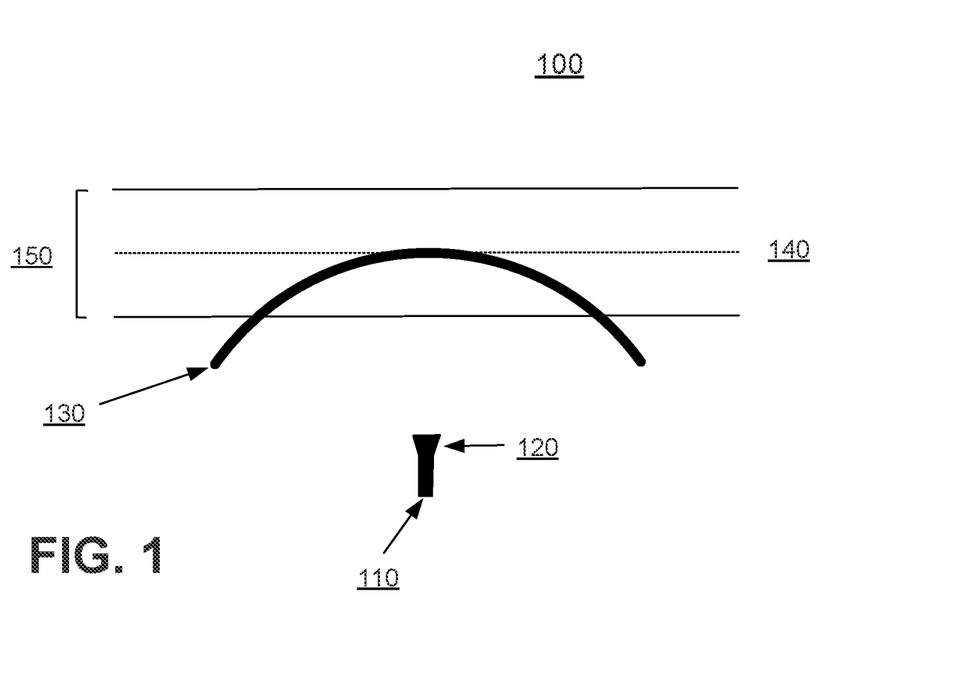
FIG. 1 is a diagram showing a setup in which a camera and lens does not optically focus beyond an optical focal plane/limit defined by the surface of a display screen.

FIG. 1 is a diagram showing a setup 100 in which a camera 110 and lens 120 does not optically focus beyond an optical focal plane/limit 140 defined by the surface of a display screen 130. In this setup 100, an area of acceptable optical focus 150 can be defined to be a predetermined range of distances from the optical focus limit 140.

Certain implementations of the present disclosure provide for implementing a technique for automatically switching between optical lens parameters and virtual lens parameters depending on the physical location of a camera in relation to a defined fixed focal target.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in implementations can include, but are not limited to, one or more of the following items: (a) real-time communication with a camera and a control computer where the computer determines the parameters to use; (b) built-in scene representation for the camera and/or lens and the system does the determination there; (c) an Indoor Positioning System (IPS) for camera location tracking; and (d) external positional tracking systems and communication with the camera and lens, and/or a control processor.

Figure 2A:
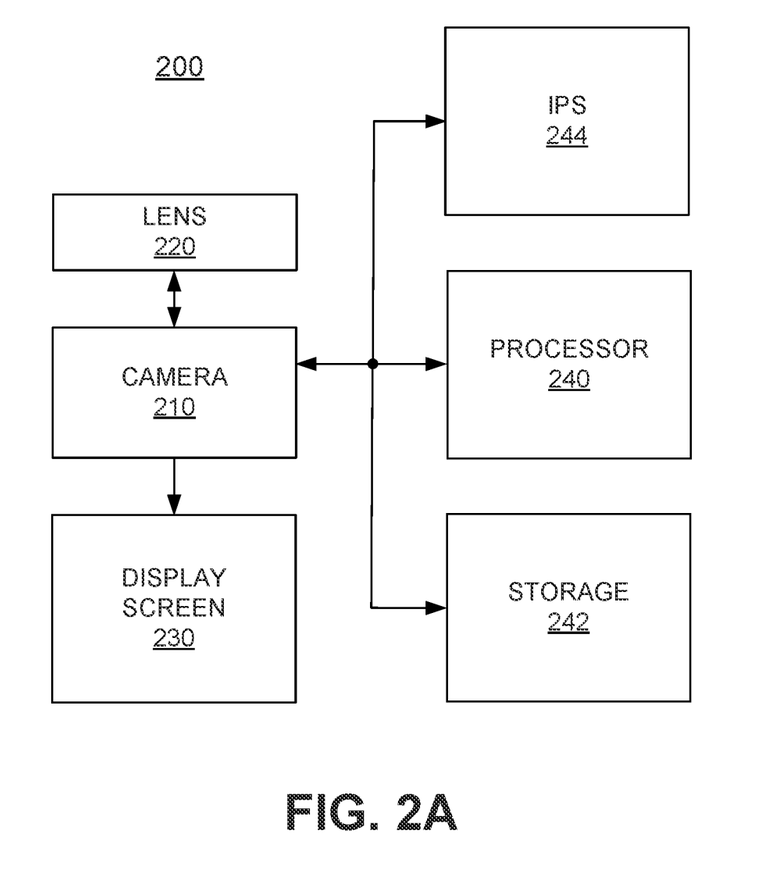
FIG. 2A is a block diagram of a video capture system in accordance with one implementation of the present disclosure.

FIG. 2A is a block diagram of a video capture system 200 in accordance with one implementation of the present disclosure. In the illustrated implementation of FIG. 2A, the video capture system 200 includes a camera 210 and lens 220, a display screen 230, and other components for video capture such as a processor 240 and a storage unit 242.

In one implementation, as indicated above, the camera 210 includes optical lens parameters, virtual lens parameters, and a physical scene awareness aspect. The camera 210 manages the physical scene awareness aspect in combination with the display screen 230, the processor 240, and the storage unit 242. In one implementation, the system 200 also includes an indoor positional system (IPS) 244 and an automated way to use the appropriate parameters (i.e., optical or virtual) in combination with the processor 240 and the storage unit 242.

For the physical scene awareness aspect using the IPS 244 in combination with the processor 240, the camera 210 is configured to sense its own location with respect to the physical space and determine the focus target (i.e., where the display screen 130 is physically located) in the scene for which the focus and zoom cannot go beyond. As the optical zoom or focus is changed on the lens and the focus target is reached, the lens is automatically switched off of the optical operation and is made to work effectively with virtual zoom and focus (while still operating the optical controls). The camera 210 then sends the digital parameters (e.g., the virtual lens parameters) to the system 200 which updates the virtual camera with the corresponding values. Thus, by using seamless automated optical and virtual lens parameters, it is possible to focus and zoom into the virtual 3-D scene.

Figure 2B:
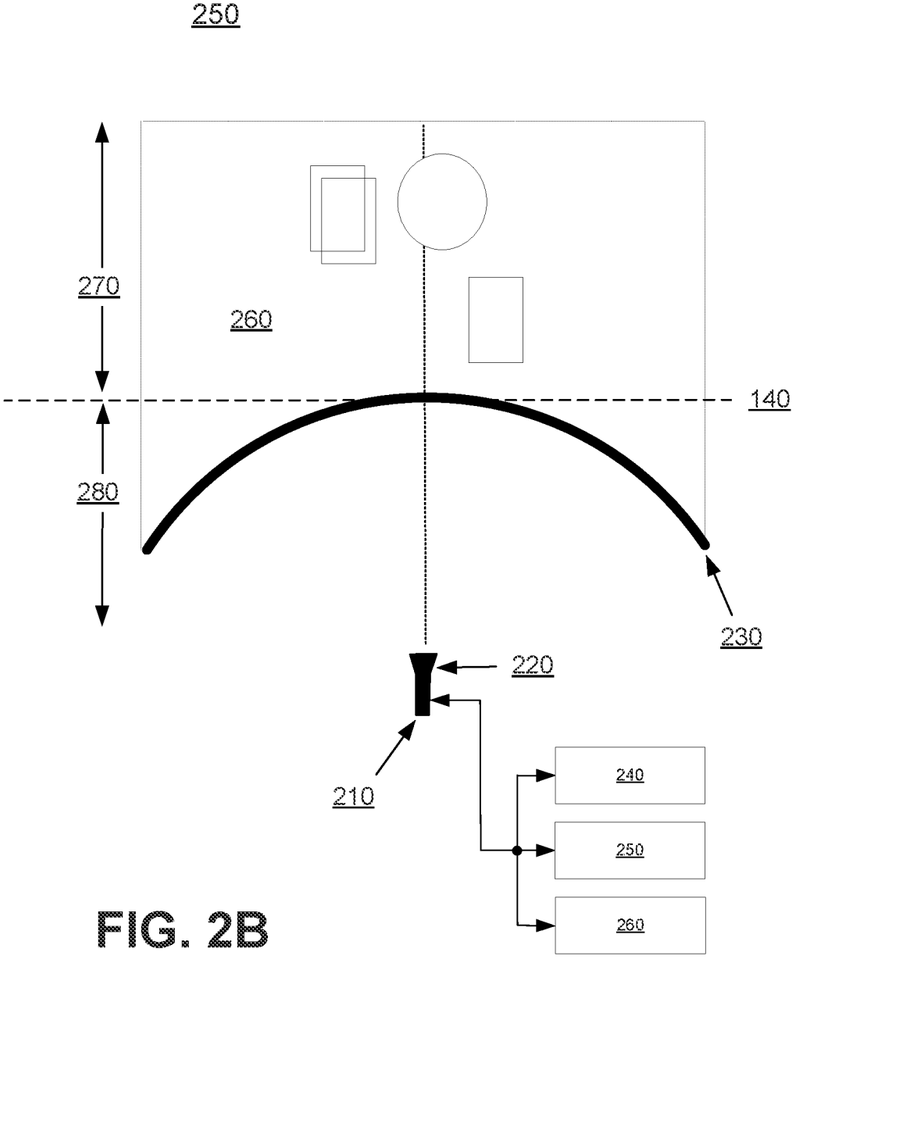
FIG. 2B is a diagram showing a new setup illustrating seamless virtual and optical lens parameter shifting in accordance with one implementation of the present disclosure.

FIG. 2B is a diagram showing a new setup 250 illustrating seamless virtual and optical lens parameter shifting in accordance with one implementation of the present disclosure. The illustrated implementation of FIG. 2B includes the camera 210, the lens 220, and the display screen 230. The new setup 250 also includes the processor 240, the storage unit 242, and the IPS 244. In the new setup 250 of FIG. 2B, the seamless virtual and optical lens parameter shifting enables zooms and focuses which operate "beyond the screen" but still remain "inside the volume."

In the illustrated implementation of FIG. 2B, the lens 120 operates similarly to optical to digital focus and zoom found in consumer point-and-shoot cameras. However, this implementation is configured so that the digital version forwards the optical lens parameters, as opposed to a singular multiplier value. The camera 210 stores a representation of the physical scene. In one implementation, the representation is stored as a "scene registration" as part of its firmware. In another implementation, the representation is stored in storage that is housed externally, such as in a small hardware unit attached to the camera 210, or as part of an entirely separate system communicated with using high-speed networking.

In the illustrated implementation of FIG. 2B, as mentioned above, the camera 210 (including the lens 220) has spatial awareness of the physical scene and position and orientation of the display screen 230, as well as its own orientation in relation to the display screen 230 and the physical space. The lens parameter changes are passed to a control system (on camera, or off camera). Further, a feedback loop between the camera 210 and the lens 220 (supported by the processor 240, the storage unit 242, and the IPS 244) is created to enable the lens 220 to communicate its settings to the scene registration, which communicates back whether the parameters of the optical zoom and focus 280 are to be used. The feedback loop system provides a progressive morphological lens parameter exchange. When this feedback loop system determines that the optical lens parameters can no longer be used because the focus of the lens 220 is beyond the optical focal limit 140, the lens 220 automatically switches to the parameters of the virtual zoom and focus 270. These virtual parameters are communicated to an external virtual camera system that does the rendering of the virtual scene 260 on the display screen 230. In one implementation, these virtual parameters may always be sent, even when the optical parameters are used, so that the virtual camera system can adjust settings as required in real-time.

In one implementation, the virtual camera system provides a virtual camera and lens with the same characteristics as the optical version. Alternatively, the virtual camera system can include a conversion function that will map the parameters from the optical system to the virtual system. Additionally, the position and orientation of the optical camera are communicated to the virtual camera system. The virtual camera system includes an algorithm that converts the optical lens parameters and the optical camera spatial information into the virtual equivalents. This optical to virtual conversion is used to, but not limited to, calculate and display such effects as depth of field (DoF), auto-exposure, and other camera effects. Thus, when the lens parameters and spatial information of the optical lens and camera are combined with the virtual equivalents as described, the virtual camera system can zoom and focus into the virtual 3D objects in a way that is not possible or difficult using an optical solution only.

Figure 3:
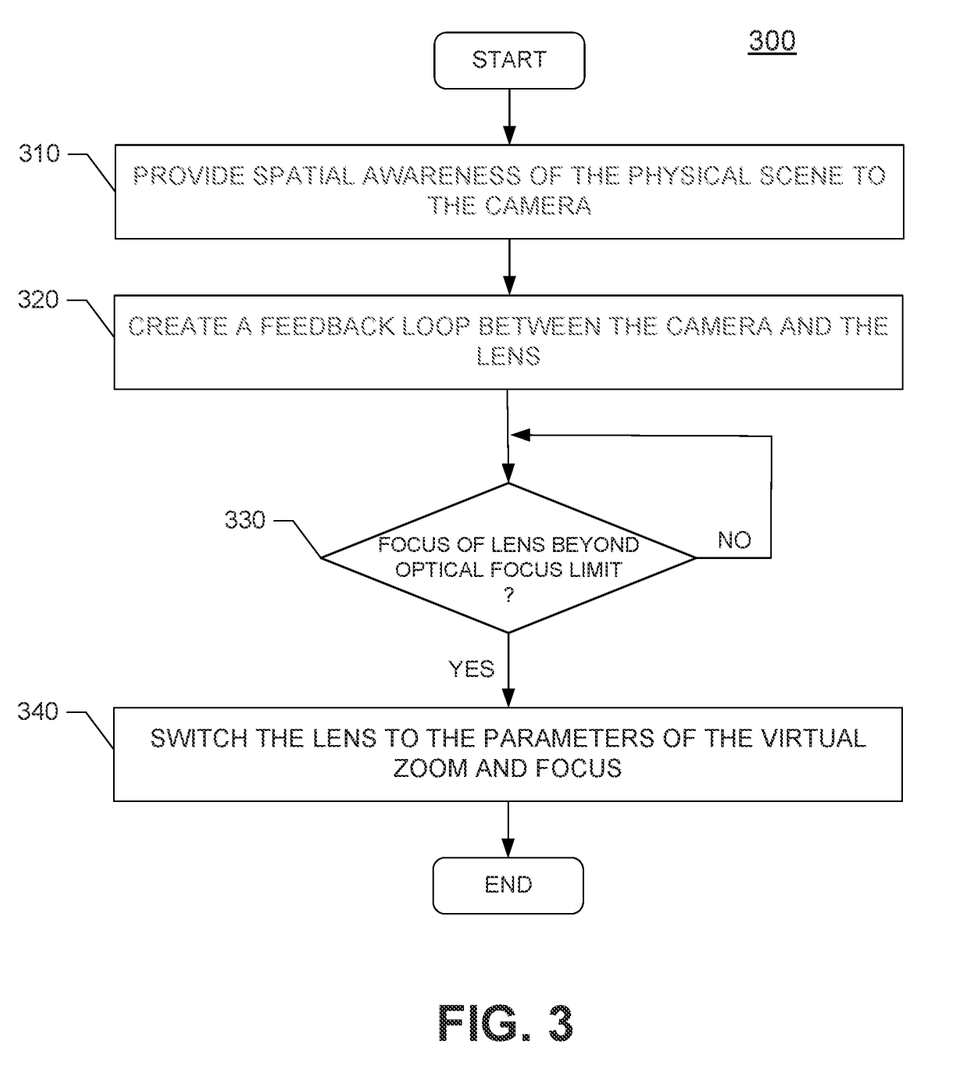
FIG. 3 is a flow diagram illustrating a method for seamless virtual and optical lens parameter shifting for a camera positioned within a physical scene in accordance with one implementation of the present disclosure.

FIG. 3 is a flow diagram illustrating a method 300 for seamless virtual and optical lens parameter shifting for a camera positioned within a physical scene in accordance with one implementation of the present disclosure. In the illustrated implementation of FIG. 3, the seamless virtual and optical lens parameter shifting enables zooms and focuses which operate "beyond the screen" but still remain "inside the volume."

In the illustrated implementation of FIG. 3, a spatial awareness of the physical scene, including position and orientation of the display screen 230, is provided to the camera 210 (including the lens 220), at step 310. In one implementation, the spatial awareness also includes the orientation of the camera 210 in relation to the display screen 230 and the physical space. As described above, the camera 210 manages the physical scene awareness aspect in combination with the display screen 230, the processor 240, and the storage unit 242. In one implementation, the system 200 also includes an indoor positional system (IPS) 244 and an automated way to use the appropriate parameters (i.e., optical or virtual) in combination with the processor 240 and the storage unit 242.

In one implementation, a feedback loop between the camera 210 and the lens 220 is created, at step 320, to enable the lens 220 to communicate its settings to the scene registration. In one implementation, the feedback loop system provides a progressive morphological lens parameter exchange by determining, at step 330, when the optical lens parameters can no longer be used because the focus of the lens 220 is beyond the optical focal limit 140. Thus, when the feedback loop system determines (at step 330) that the focus of the lens 220 is beyond the optical focal limit 140, the lens 220 automatically shifts from using the optical lens parameters to using the virtual lens parameters of the virtual zoom and focus 270, at step 340. These virtual parameters are communicated to an external virtual camera system that does the rendering of the virtual scene 260 on the display screen 230. In one implementation, these virtual parameters may always be sent, even when the optical parameters are used, so that the virtual camera system can adjust settings as required in real-time.

In one implementation, the virtual camera system provides a virtual camera and lens with the same characteristics as the optical version. Alternatively, the virtual camera system can include a conversion function that will map the parameters from the optical system to the virtual system. Additionally, the position and orientation of the optical camera are communicated to the virtual camera system. The virtual camera system includes an algorithm that converts the optical lens parameters and the optical camera spatial information into the virtual equivalents. This optical to virtual conversion is used to, but not limited to, calculate and display such effects as depth of field (DoF), auto-exposure, and other camera effects. Thus, when the lens parameters and spatial information of the optical lens and camera are combined with the virtual equivalents as described, the virtual camera system can zoom and focus into the virtual 3D objects in a way that is not possible or difficult using an optical solution only.

Figure 4A:
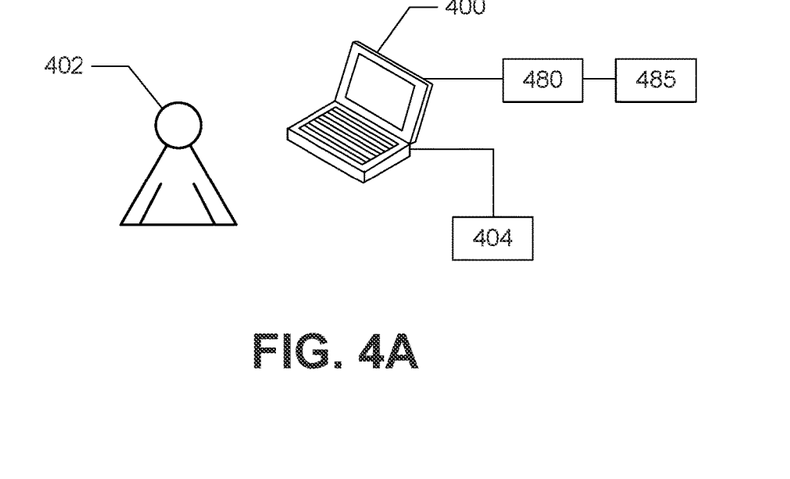
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an application 490 for seamless virtual and optical lens parameter shifting as illustrated and described with respect to the video capture system 200 in FIG. 2A and the method 300 for seamless virtual and optical lens parameter shifting in FIG. 3.

Figure 4B:
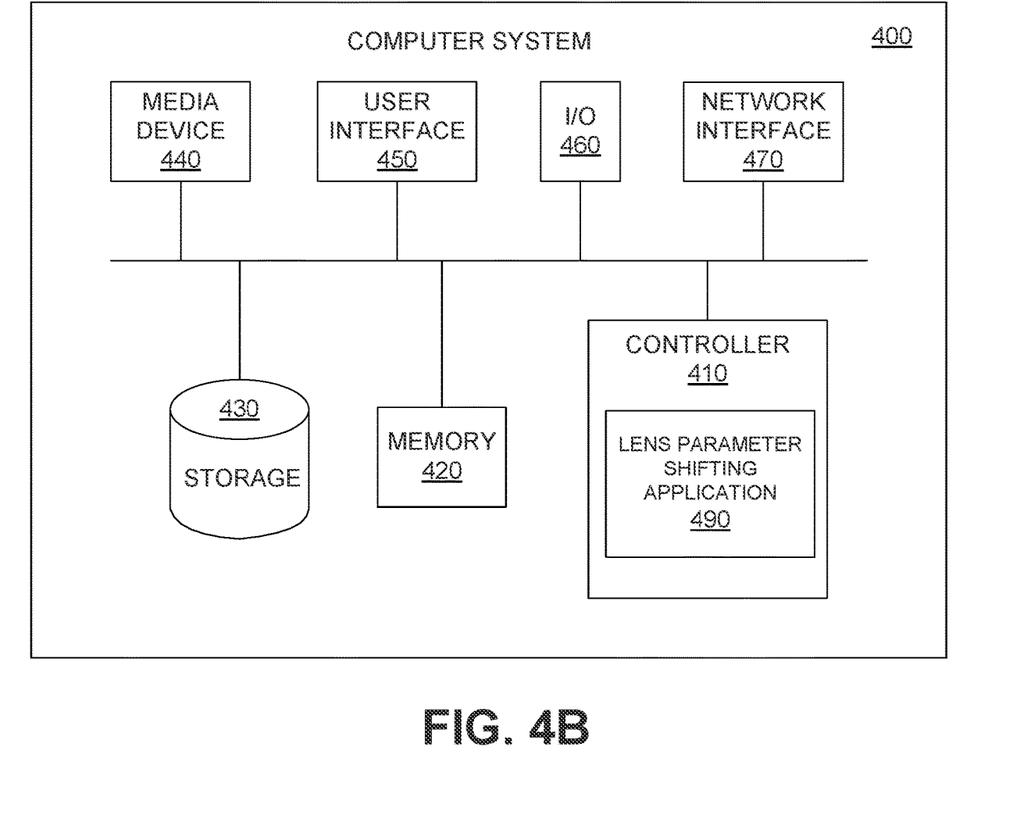
FIG. 4B is a functional block diagram illustrating the computer system hosting the lens parameter shifting application in accordance with an implementation of the present disclosure.

The computer system 400 stores and executes the lens parameter shifting application 490 of FIG. 4B. In addition, the computer system 400 may be in communication with a software program 404. Software program 404 may include the software code for the lens parameter shifting application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the lens parameter shifting application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the lens parameter shifting application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the lens parameter shifting application 490 with a software system, such as to perform the matte generation process to extract the subject from the environment without the need for a green screen. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the lens parameter shifting application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Although the above description includes systems and methods for seamless virtual and optical lens parameter shifting in video capture, the described systems and methods are applicable in other field such as in medical imaging.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

One implementation includes one or more programmable processors and corresponding computer system components to store and execute computer instructions, such as to provide the virtual camera system and the progressive morphological lens parameter exchange and encoding.

Additional variations and implementations are also possible. For example, multiple camera systems can be used together, such as using a rig mounted with more than one optical camera or a production setting with multiple camera rigs. In one such example, the system adjusts which set of optical parameters to use based on selecting an active camera.

The invention claimed is:

1. A method of automatically shifting between virtual lens parameters and optical lens parameters for an optical camera positioned within a physical scene, the method comprising:
   providing a spatial awareness of the physical scene including position and orientation of a display screen to the optical camera;
   creating a feedback loop between the optical camera and lens to enable the lens to communicate lens settings to a scene registration;
   determining when focus of the lens is beyond an optical focal limit from the lens settings; and
   enabling the lens, by the scene registration, to automatically shift from using the optical lens parameters to using the virtual lens parameters when the focus of the lens moves beyond the optical focal limit.

2. The method of claim 1, wherein the spatial awareness of the physical scene includes orientation of the optical camera in relation to the display screen.

3. The method of claim 1, wherein the spatial awareness of the physical scene is managed by a processor and a storage unit in combination with the display screen.

4. The method of claim 1, wherein the spatial awareness of the physical scene includes an indoor positional system.

5. The method of claim 1, further comprising
   communicating the virtual lens parameters to a virtual camera system to render a virtual scene on the display screen.

6. The method of claim 5, wherein the virtual lens parameters are continuously communicated to the virtual camera system, even when the optical lens parameters are used, so that the virtual camera system can adjust settings for real-time operation.

7. The method of claim 5, wherein the virtual camera system provides a virtual camera and lens with same characteristics as the optical camera.

8. The method of claim 7, wherein the virtual camera system includes a conversion function to map parameters from the optical camera to the virtual camera.

9. The method of claim 5, further comprising
   communicating position and orientation of the optical camera to the virtual camera system.

10. The method of claim 5, wherein the virtual camera system includes an algorithm that converts the optical lens parameters and orientation of the optical camera into converted virtual lens parameters.

11. The method of claim 10, further comprising
    calculating and displaying at least one of depth of field and auto-exposure using the converted virtual lens parameters.

12. A system of automatically shifting between virtual lens parameters and optical lens parameters, the system comprising:
    an optical camera and lens positioned within a physical scene;
    a display screen positioned within the physical scene; and
    a processor to provide a spatial awareness of the physical scene including position and orientation of the display screen to the optical camera, to create a feedback loop between the optical camera and the lens to receive the lens settings from the lens, to determine when focus of the lens is beyond an optical focal limit from the lens settings, and to enable the lens to automatically shift from using the optical lens parameters to using the virtual lens parameters when the focus of the lens moves beyond the optical focal limit.

13. The system of claim 12, wherein the spatial awareness of the physical scene includes orientation of the optical camera in relation to the display screen.

14. The system of claim 12, wherein the processor manages the spatial awareness of the physical scene in combination with the display screen and a storage unit.

15. The system of claim 12, further comprising
an indoor positional system to provide the spatial awareness of the physical scene to the processor.

16. The system of claim 12, further comprising
a virtual camera system to render a virtual scene on the display screen using the virtual lens parameters.

17. The system of claim 16, wherein the virtual camera system provides a virtual camera and lens with same characteristics as the optical camera.

18. The system of claim 17, wherein the virtual camera system includes a conversion function to map parameters from the optical camera to the virtual camera.

19. The system of claim 16, wherein the virtual camera system includes an algorithm that converts the optical lens parameters and orientation of the optical camera into converted virtual lens parameters.

20. The system of claim 19, wherein the processor calculates and displays at least one of depth of field and auto-exposure using the converted virtual lens parameters.

\* \* \* \* \*